3,419,582
PENTACYCLIC STEROIDS AND PROCESS
Alberto Ercoli, Milan, and Rinaldo Gardi, Carate Brianza, Milan, Italy, assignor, by mesne assignments, to Warner-Lambert Pharmaceutical Company, Morris Plains, N.J., a corporation of Delaware
No Drawing. Filed Aug. 19, 1966, Ser. No. 573,452
Claims priority, application Italy, Aug. 23, 1965, 18,856/65
21 Claims. (Cl. 260—397.3)

The present invention is concerned with new steroid derivatives having an additional ring condensed between the 4 and 6 positions of the cyclopentaneopolyhydrophenanthrene nucleus. More particularly this invention relates to a new 3-keto benzo[d,e]steroids and to a process for their preparation from $\Delta^4$-3-ketosteroids. The invention also relates to certain new enolethers of $\Delta^4$-3-ketosteroids useful as intermediates in said process.

The new 3-keto benzo[d,e]steroids of this invention are characterized by having in rings A and B of the steroid nucleus the structure:

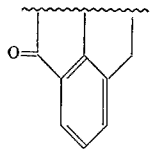

(I)

The new enolethers of $\Delta^4$-3-ketosteroids which are used as intermediates in the process of this invention may be represented schematically as follows:

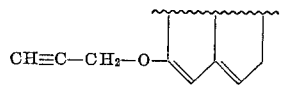

(II)

We have found that the propargyl enolethers of $\Delta^4$-3-keto steroids of Formula II above can be directly converted into 3-keto benzo [d,e]steroids of Formula I above, when heated at a temperature higher than 100° C. in an anhydrous organic reaction medium, preferably in the presence of a cyclohydrogenation catalyst. Under such conditions the 3-propargyl enolethers undergo rearrangement and cyclodehydrogenation to give pentacyclic steroids with an aromatic ring.

The invention thus provides a process for preparing 3-keto benzo[d,e]steroids from propargyl enolethers of corresponding $\Delta^4$-3-keto steroids.

The medium of the reaction can be selected from anhydrous organic solvents having a boiling point higher than 100° C. which may be polar or non-polar, the polar solvents being, however, the most suitable for the reaction. Preferred organic media are pyridine, picolines, lutidines, collidines, quinoline, isoquinoline, pyrimidine, pyrazine, dimethylformamide, dimethylacetamide, dimethsulfoxide, dimethylaniline, diethylaniline, dimethyltoluidines, chlorobenzene, o-dichlorobenzene, benzonitrile, ethyl cinnamate, butyl alcohol, amyl alcohol. Pyridine, dimethylsulfoxide and dimethylformamide are particularly preferred.

The process of the present invention is generally conducted by dissolving or suspending the starting propargyl enolether in the reaction medium and by heating at reflux for a period of from about 2 to about 12 hours. When the solvent chosen for the reaction has a boiling point higher than 200° C., it is advisable to operate at a temperature lower than the boiling temperature since the best results are obtained by conducting the process at temperatures from about 110° C. to about 180° C.

When pyridine or dimethylformamide are used as reaction medium, the desired 3-keto benzo[d,e]steroid may be obtained in good yield also in the absence of any catalyst, but as a rule the formation of the benzo[d,e] steroid is always favoured by operating in the presence of a cyclodehydrogenation catalyst, such as palladium or platinum. These catalysts may be employed with a charcoal or asbestos carrier containing 2–30 percent of the metal, but we prefer to use palladium-charcoal at 5–10%.

The 3-keto benzo[d,e]steroids may be isolated from the reaction mixture according to known procedures, for example by evaporation of the solvent followed by recrystallization of the residue. The products of the reaction may be also recovered by pouring the mixture in water and separating by filtration the precipitate formed or extracting with a suitable water-immiscible solvent.

The process of the present invention can be applied to propargyl enolethers of any $\Delta^4$-3-ketosteroid of the androstane, 19-nor-androstane, pregnane, 19-nor-pregnane, cholestane, 19-nor-cholestane or sapogenine series, to give the corresponding 3-keto benzo[d,e]steroid. The starting steroid compound may be of great variety and may have hydroxyl, keto, halogen and ester groups in various positions of the nucleus or side chain. Thus, hydroxy groups may be present in the 11, 17, 20 or 21 positions and these hydroxy groups may be also esterified with a lower hydrogen carboxylic acid.

Keto groups may be present in the 11, 17 and 20 positions, while halogen, such as chlorine and fluorine, may be attached to the 9-carbon atom and may also occupy the 2 and/or 16 positions. Other substituents, such as methyl or methylene groups, may be present, for example in 16 position of pregnene derivatives or in the cholestane side chain, while lower alkyl, alkenyl or alkynyl groups may be contained in the 17α-position of the various androstene compounds. Furthermore the steroid can be saturated in the C and D rings or can contain double bonds, for example in the 9–11 and/or 16–17 positions.

The process of this invention provides new 3-keto benzo [d,e]steroids of the androstane and pregnane series represented by the following general formula:

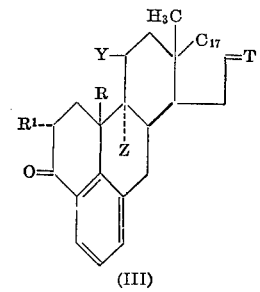

(III)

in which R is hydrogen or methyl, $R^1$ is hydrogen, fluorine or methyl, Y is hydrogen, a β-hydroxy group or a keto group, Z is hydrogen or a halogen atom, particularly fluorine or chlorine T, is $H_2$, (αH, βCH$_3$), (αCH$_3$, βH), (αH, βF), (αF, βH), (αH, βCl), (αCl, βH) or $=CH_2$, and the $C_{17}$ carbon atom has the following structure

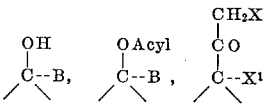

wherein X and $X^1$ represent each hydrogen, hydroxy or a lower acyloxy group (OAcyl) containing up to 9 carbon atoms and B is hydrogen or a saturated or unsaturated lower hydrocarbon radical of from 1 to 3 carbon atoms, inclusive, such as methyl, ethyl, propyl, ethynyl, allyl, propynyl, T being $H_2$ when B is other than hydrogen.

The term "lower acyloxy group up to 9 carbon atoms" includes acyloxy groups derived from alkanoic acids, such as acetic, propionic, butyric, valeric, caproic, oenanthic, caprylic and pelargonic acids; acyloxy groups derived from phenylalkanoic acids, such as phenylacetic and phenyl propionic acids; acyloxy groups derived from cycloalkylalkanoic acids, such as cyclopentylpropionic acid and acyloxy groups derived from bicarboxylic acids, such as succinic acid. Preferred lower acyloxy group is the acetoxy group.

The new pentacyclic steroids of this invention possess a pronounced antigonadotrophic activity and are useful for inducing a decrease of hypophysis hormonal secretion.

Preferred pentacyclic compounds in the androstane series are the benz[d,e]androstan-17β-ol-3-one of the formula:

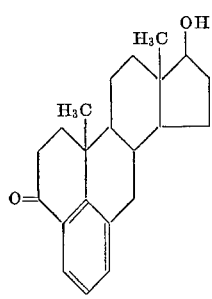

(IIIa)

and its corresponding 17β-lower OAcyl esters, particularly the 17β-acetate. These compounds show a remarkable antigonadotrophic activity and a satisfactory anabolic effect without androgenic side effects.

Preferred pentacyclic compounds in the 19-nor-androstane series are the 19-nor-benz[d,e]androstan-17β-ol-3-one of the formula:

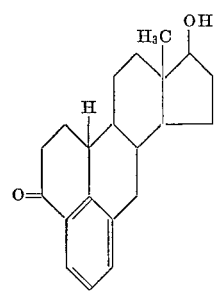

(IIIb)

the 17α-ethynyl-19-nor-benz[d,e]androstan-17β-ol-3-one of formula:

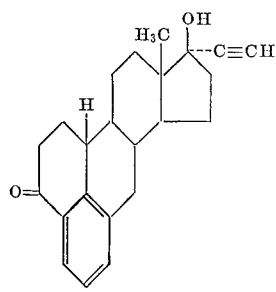

(IIIc)

and their corresponding 17β-lower OAcyl esters, particularly the 17β-acetates which derivatives also possess antiovulatory activity.

Preferred pentacyclic compounds in the pregnane series are the 3-keto-21-desoxy-benz[d,e]steroids of the formulas:

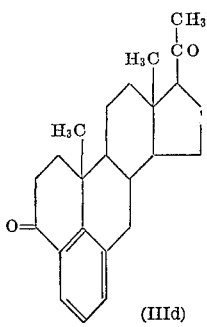 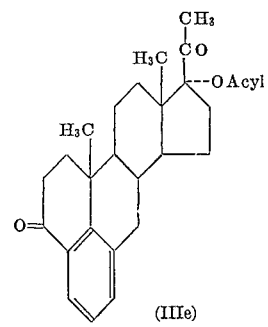

(IIId) (IIIe)

where Acyl is as defined above, the 3-keto-21-hydroxy benzo[d,e]steroids of the formula:

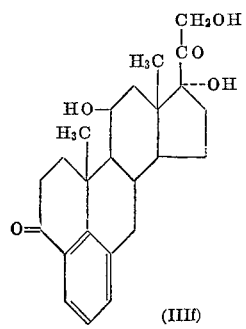

(IIIf)

and the 9α-halo derivatives, particularly 9α-fluoro or 9α-chloro, the 9α-halo-16α- or 16β-methyl derivatives, particularly 9α-fluoro-16α-methyl and 9α-fluoro-16β-methyl derivatives of said 21-hydroxy benzo[d,e]steroid, as well as the 17α- and/or 21-acylates of the above-enumerated derivatives.

The propargyl enolethers which are employed as intermediates in the synthesis of the 3-keto benzo[d,e]-steroids of this invention represent a series of steroid enolethers not yet described in the literature. They can be prepared from the corresponding lower alkyl enolethers or from enol esters or also from ketals of $\Delta^4$-3-ketosteroids through an exchange reaction with propargyl alcohol. The trans-etherification is carried out by dissolving a lower alkyl enolether, preferably the methyl- or ethyl enolether or a lower alkanoyl enol ester, preferably the enol-acetate, or also a ketal, such as the ethylene ketal, in a proper organic solvent selected from benzene, toluene, hexane, cyclohexane, petroleum ether, tetrahydrofurane, dioxane, methylene chloride or chloroform. The resulting solution is heated with an excess of propargyl alcohol in the presence of a catalyst, such as an aromatic sulphonic acid or a salt of a weak base with a strong acid, such as pyridine hydrochloride or tosylate, according to the procedure described in the U.S. Patent Ser. No. 3,019,241.

The propargyl enolethers of $\Delta^4$-3-ketosteroids can be isolated from the reaction mixture by simple neutralization of the acid catalyst with a weak organic base, such as pyridine, evaporation of the solvent in vacuo and recrystallization of the residue from a suitable solvent or solvents mixture.

Preferred new propargyl enolethers which are used, according to the process of this invention, for the preparation of the 3-keto benzo[d,e]steroids of Formula III above, are those characterized by the following general formula:

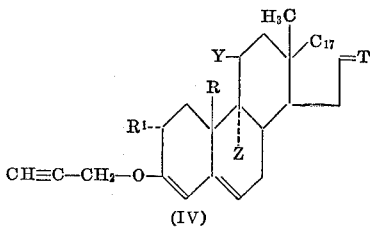

(IV)

in which R, R¹, T, Y, Z and the $C_{17}$ carbon atom have the above stated meaning.

The following examples are illustrative of this invention, but they are not to be construed as limiting.

EXAMPLE 1

10 g. of 3-ethyl enolether of testosterone acetate obtained by treatment of testosterone acetate with ethyl orthoformate, are dissolved in 800 cc. of anhydrous dioxane and treated with 200 mg. of p. toluenesulphonic acid and 15 cc. of propargyl alcohol. The reaction mixture is heated up to boiling and distilled until small volume. To the residual solution some drops of pyridine are added, then the mixture is concentrated under vacuum. The residue is taken up with ether, the solution is filtered and the solvent evaporated to obtain 3-propargyloxy-17β-acetoxy-$\Delta^{3,5}$-androstadiene (3-propargyl enolether of testosterone acetate), M.P. 149–151° C.; $[\alpha]_D^{22}=-148°$ (dioxane, c.=0.5%).

A solution of 2 g. of 3-propargyl enolether of testosterone acetate in 30 cc. of pyridine is heated at reflux for 4 hours in the presence of 200 mg. of 5% palladium on charcoal. After filtration of the catalyst the solvent is evaporated under vacuum and the residue crystallized from methanol. 700 mg. of 17β-acetoxy-benz[d,e]-androstan-3-one are so obtained. M.P. 143–145° C.; $[\alpha]_D^{22}=-14.5°$ (dioxane, c.=0.5%).

EXAMPLE 2

An anhydrous solution of 3 g. of ethyl enolether of testosterone propionate, 300 mg. of pyridine tosylate and 5 cc. of propargyl alcohol in 500 cc. of benzene is heated at reflux for about 30 minutes, then it is slowly distilled to small volume. After addition of a few drops of pyridine the residual solution is evaporated under vacuum and the residue consisting of crude 3-propargyloxy-17β-propionoxy-$\Delta^{3,5}$-androstadiene is dissolved without further purification in 30 cc. of dimethylformamide and the solution so obtained is heated at 115° C. for 4 hours in the presence of 100 mg. of 5% palladium on charcoal. By evaporating as in Example 1, the 17β-propionoxy-benz[d,e]androstan-3-one is obtained in 20% yield; M.P. 129–131° C.; $[\alpha]_D^{22}=-13°$ (dioxane, c.=0.5%). The same product is obtained, but in lower yield, by operating in absence of palladium.

In analogous manner 17-butyroxy-benz[d,e]androstan-3-one is obtained; M.P. 82–83° C.; $[\alpha]_D^{22}=-12°$ (dioxane, c.=0.5%).

EXAMPLE 3

An anhydrous solution of 3 g. of testosterone methyl enolether, 300 mg. of pyridine tosylate and 5 cc. of propargyl alcohol in 800 cc. of benzene is slowly distilled to small volume. After addition of a few drops of pyridine the residual solution is evaporated under vacuum and the residue consisting of crude 3-propargyloxy-$\Delta^{3,5}$-androstadien-17β-ol-3-one is dissolved in 50 cc. of dimethylaniline and the solution is heated at 115° C. for about 5 hours in the presence of 100 mg. of 10% palladium charcoal. Then the solvent is evaporated under vacuum and the residue crystallized from methanol to give benz[d,e]androstan-17β-ol-3-one, M.P. 194–196° C.; $[\alpha]_D^{22}=-2.5°$ (dioxane, c.=0.5%).

EXAMPLE 4

5 g. of 3-ethyl enolether of $\Delta^4$-androstene-3,17-dione are dissolved in 500 cc. of anhydrous benzene and treated with 100 mg. of p. toluenesulphonic acid in 15 cc. of propargyl alcohol. The reaction mixture is distilled until small volume. To the residual solution some drops of pyridine are added, then the mixture is concentrated under vacuum. The residue is taken up with ether, the solution is filtered and the solvent evaporated. The 3-propargyloxy-$\Delta^{3,5}$-androstadien-17-one is so isolated; M.P. 153–156° C.; $[\alpha]_D^{22}=-95°$ (dioxane, c.=0.5%).

The product dissolved in 30 cc. of pyridine is heated at reflux for 4 hours in the presence of 200 mg. 5% Pd/C, to give benz[d,e]androstane-3,17-dione, M.P. 188–190° C.; $[\alpha]_D^{22}=+79°$ (dioxane, c.=0.5%).

The following 3-propargyloxy-$\Delta^{3,5}$-androstadienes are analogously obtained:

3-propargyloxy-17β-valeroxy-$\Delta^{3,5}$-androstadiene
3-propargyloxy-17β-caproyloxy-$\Delta^{3,5}$-androstadiene
3-propargyloxy-17β-oenanthoxy-$\Delta^{3,5}$-androstadiene
3-propargyloxy-17β-phenylpropionoxy-$\Delta^{3,5}$-androstadiene
3-propargyloxy-17β-cyclopentylpropionoxy-$\Delta^{3,5}$-androstadiene
3-propargyloxy-17α-methyl-$\Delta^{3,5}$-androstadien-17β-ol
3-propargyloxy-17α-methyl-17β-acetoxy-$\Delta^{3,5}$-androstadiene
3-propargyloxy-17α-ethyl-$\Delta^{3,5}$-androstadien-17β-ol
3-propargyloxy-17α-propyl-$\Delta^{3,5}$-androstadien-17β-ol
3-propargyloxy-17α-allyl-17β-acetoxy-$\Delta^{3,5}$-androstadiene
3-propargyloxy-17α-ethynyl-$\Delta^{3,5}$-androstadien-17β-ol
3-propargyloxy-17α-ethynyl-17β-acetoxy-$\Delta^{3,5}$-androstadiene
3-propargyloxy-17α-propynyl-$\Delta^{3,5}$-androstadien-17β-ol
3-propargyloxy-9α-fluoro-17α-methyl-$\Delta^{3,5}$-androstadiene-11β,17β-diol
3-propargyloxy-9α-fluoro-17α-methyl-17β-acetoxy-$\Delta^{3,5}$-androstadien-11β-ol
3-propargyloxy-$\Delta^{3,5}$-androstadien-17β-ol-11-one
3-propargyloxy-16α-fluoro-$\Delta^{3,5}$-androstadien-17β-ol
3-propargyloxy-2α-methyl-17β-acetoxy-$\Delta^{3,5}$-androstadiene
3-propargyloxy-2α,17α-dimethyl-$\Delta^{3,5}$-androstadien-17β-ol
3-propargyloxy-16-methylene-$\Delta^{3,5}$-androstadien-17β-ol
3-propargyloxy-16-methylene-17β-acetoxy-$\Delta^{3,5}$-androstadiene
3-propargyloxy-16β-chloro-$\Delta^{3,5}$-androstadien-17β-ol
3-propargyloxy-2α-fluoro-17β-acetoxy-$\Delta^{3,5}$-androstadien-3-one These compounds are converted, according to the procedure described in the foregoing examples, into the corresponding benz[d,e]androstanes:

17β-valeroxy-benz[d,e]androstan-3-one
17β-caproyloxy-benz[d,e]androstan-3-one
17β-oenanthoxy-benz[d,e]androstan-3-one
17β-phenylpropionoxy-benz[d,e]androstan-3-one
17β-cyclopentylpropionoxy-benz[d,e]androstan-3-one
17α-methyl-benz[d,e]androstan-17β-ol-3-one
17α-methyl-17β-acetoxy-benz[d,e]androstan-3-one
17α-ethyl-benz[d,e]androstan-17β-ol-3-one
17α-propyl-benz[d,e]androstan-17β-ol-3-one
17α-allyl-17β-acetoxy-benz[d,e]androstan-3-one
17α-ethynyl-benz[d,e]androstan-17β-ol-3-one
17α-ethynyl-17β-acetoxy-benz[d,e]androstan-3-one
17α-propynyl-benz[d,e]androstan-17β-ol-3-one
9α-fluoro-17α-methyl-benz[d,e]androstane-11β,17β-diol-3-one
9α-fluoro-17α-methyl-17β-acetoxy-benz[d,e]androstan-11β-ol-3-one
benz[d,e]androstan-17β-ol-3,11-dione
16α-fluoro-benz[d,e]androstan-17β-ol-3-one
2α-methyl-17β-acetoxy-benz[d,e]androstan-3-one
2α,17α-dimethyl-benz[d,e]androstan-17β-ol-3-one
16-methylene-benz[d,e]androstan-17β-ol-3-one
16-methylene-17β-acetoxy-benz[d,e]androstan-3-one 16β-chloro-benz[d,e]androstan-17β-ol-3-one
2α-fluoro-17β-acetoxy-benz[d,e]androstan-3-one.

EXAMPLE 5

5 g. of 19-nor-testosterone acetate 3-ethylenketal are dissolved in 400 cc. of anhydrous dioxane and treated with 100 mg. of benzensulphonic acid and 15 cc. of propargyl alcohol. The reaction mixture is heated up to boiling and distilled until small volume. To the residual solution some drops of pyridine are added, then the mixture is concentrated under vacuum. The residue is taken up with ether, the solution is filtered and the solvent evaporated. The 3-propargyloxy-17β-acetoxy-19-nor-Δ$^{3,5}$-androstadiene is so obtained; M.P. 111–114° C., $[\alpha]_D^{22}=-156°$ (dioxane, c.=0.5%).

A solution of 2 g. of this product in 30 cc. of pyridine is heated at reflux for 6 hours in the presence of 200 mg. of 5% Pd/C., as in Example 1 to obtain 17β-acetoxy-19-nor - benz[d,e]androstan - 3 - one, M.P. 182–185° C.; $[\alpha]_D^{22}=-56.5°$ (dioxane, c.=0.5%).

EXAMPLE 6

3 g. of 17α-ethynyl-19-nor-testosterone acetate 3-methyl enolether in 50 cc. of anhydrous tetrahydrofuran are treated with 60 mg. of sulfosalicylic acid and 5 cc. of propargyl alcohol. The mixture is heated and distilled in order to reduce the total volume of the solution to about ¼. Then a few drops of pyridine are added and the solvent is completely removed under vacuum. The residue is taken up with dilute methanol, filtered and dried to give 3 - propargyloxy - 17α - ethynyl-17β-acetoxy-19-nor-Δ$^{3,5}$-androstadiene; M.P. 187–188° C.; $[\alpha]_D^{22}=-216°$ (dioxane, c.=0.5%).

In the same manner the following 3-propargyloxy-19-nor-Δ$^{3,5}$-androstadienes are obtained:

3-propargyloxy-19-nor-Δ$^{3,5}$-androstadien-17β-ol
3-propargyloxy-17β-propionoxy-19-nor-Δ$^{3,5}$-androstadiene
3-propargyloxy-17α-methyl-19-nor-Δ$^{3,5}$-androstadien-17β-ol
3-propargyloxy-17α-methyl-17β-acetoxy-19-nor-Δ$^{3,5}$-androstadiene
3-propargyloxy-17α-ethynyl-19-nor-Δ$^{3,5}$-androstadien-17β-ol.

EXAMPLE 7

A solution of 2 g. of 3-propargyloxy-17α-ethynyl-17β-acetoxy-19-nor-Δ$^{3,5}$-androstadiene in 30 cc. of pyridine is heated at reflux for 4 hours in the presence of 200 mg. of 5% Pd/C. The reaction mixture worked as in Example 1 affords 17α - ethynyl-17β-acetoxy-19-nor-benz[d,e]androstan-3-one, M.P. 229–231° C.; $[\alpha]_D^{22}=-81°$ (dioxane, c.=0.5%).

Other 19-nor-benz[d,e]androstanes are similarly obtained:

17β-propionoxy-19-nor-benz[d,e]androstan-3-one
17β-butyroxy-19-nor-benz[d,e]androstan-3-one
17α-methyl-19-nor-benz[d,e]androstan-17β-ol-3-one
17α-methyl-17β-acetoxy-19-nor-benz[d,e]androstan-3-one
17α-ethynyl-19-nor-benz[d,e]androstan-17β-ol-3-one

EXAMPLE 8

10 g. of 3-ethyl enolether of progesterone are dissolved in 800 cc. of anhydrous dioxane and treated with 200 mg. of p. toluenesulphonic acid and 15 cc. of propargyl alcohol. The reaction mixture is heated up to boiling and distilled until small volume. To the residual solution there are added some drops of pyridine, then the mixture is concentrated under vacuum. The residue, recrystallized from hexane, affords 3-propargyl enolether of progesterone melting at 157–158° C.; $[\alpha]_D^{22}=-62°$ (dioxane, c.=0.5%).

Other similarly obtained 3-propargyloxyΔ$^{3,5}$-pregnadienes are:

3-propargyloxy-17α-acetoxy-Δ$^{3,5}$-pregnadien-20-one
3-propargyloxy-17α-propionoxy-Δ$^{3,5}$-pregnadien-20-one
3-propargyloxy-17α-butyroxy-Δ$^{3,5}$-pregnadien-20-one
3-propargyloxy-17α-valeroxy-Δ$^{3,5}$-pregnadien-20-one
3-propargyloxy-17α-caproyloxy-Δ$^{3,5}$-pregnadien-20-one
3-propargyloxy-17α-oenanthoxy-Δ$^{3,5}$-pregnadien-20-one
3-propargyloxy-Δ$^{3,5}$-pregndien-17α-ol-20-one
3-propargyloxy-16-methylene-Δ$^{3,5}$-pregnadien-20-one
3-propargyloxy-16-methylene-17α-acetoxy-Δ$^{3,5}$-pregnadien-20-one
3-propargyloxy-19-nor-Δ$^{3,5}$-pregnadien-20-one
3-propargyloxy-17α-acetoxy-19-nor-Δ$^{3,5}$-pregnadien-20-one
3-propargyloxy-Δ$^{3,5}$-pregnadien-21-ol-20-one
3-propargyloxy-21-acetoxy-Δ$^{3,5}$-pregnadien-20-one.

These compounds are converted, according to the procedure described in Example 1, into the following corresponding 3-keto benzo[d,e]pregnanes:

benzo[d,e]pregnane-3-20-dione
17α-acetoxy-benzo[d,e]pregnane-3,20-dione
17α-propionoxy-benzo[d,e]pregnane-3,20-dione
17α-butyroxy-benzo[d,e]pregnane-3,20-dione
17α-valeroxy-benzo[d,e]pregnane-3,20-dione
17α-caproyloxy-benzo[d,e]pregnane-3,20-dione
17α-oenanthoxy-benzo[d,e]pregnane-3,20-dione
benzo[d,e]pregnan-17α-ol-3,20-dione
16-methylene-benzo[d,e]pregnane-3,20-dione
16-methylene-17α-acetoxy-benzo[d,e]pregnane-3,20-dione
19-nor-benzo[d,e]pregnane-3,20-dione
17α-acetoxy-19-nor-benzo[d,e]pregnane-3,20-dione
benzo[d,e]pregnan-21-ol-3,20-dione
21-acetoxy-benzo[d,e]pregnane-3,20-dione

EXAMPLE 9

10 g. of 3-ethyl enolether of 21-acetoxy-Δ$^4$-pregnen-17α-ol-3,20-dione (obtained by treatment of cortexolone acetate with ethyl orthoformate) are dissolved in 800 cc. of anhydrous dioxane and treated with 200 mg. of p. toluenesulphonic acid and 15 cc. of propargyl alcohol to obtain 3-propargyloxy-21-acetoxy-Δ$^{3,5}$-pregnadien-17α-ol-20-one, M.P. 169–172° C.; $[\alpha]_D^{22}=-35°$ (dioxane, c.=0.5%).

A solution of 2 g. of the product so obtained in 50 cc. of pyridine is heated at reflux for two hours in the presence of 100 mg. of 5% Pd/C. After filtration of the catalyst and evaporation of the solvent, the residue is recrystallized from methanol to give 21-acetoxy-benzo[d,e]pregnan - 17α - ol - 3,20 - dione; M.P. 164–166° C.; $[\alpha]_D^{22}=+58°$ (dioxane, c.=0.5%).

EXAMPLE 10

5 g. of 3-ethyl enolether of cortisone acetate are dissolved in 500 cc. of anhydrous benzene and treated with 100 mg. of p. toluenesulphonic acid in 15 cc. of propargyl alcohol. By operating in the usual manner, there are obtained 2.7 g. of 3-propargyloxy-21-acetoxy-Δ$^{3,5}$-pregnadien-17α-ol-11,20-dione, M.P. 164–167° C.;

$$[\alpha]_D^{22}=+17°$$

(dioxane, c.=0.5%).

The same procedure may be applied to the preparation of the following propargyl enolethers:

3-propargyloxy-Δ$^{3,5}$-pregnadiene-17α,21-diol-20-one
3-propargyloxy-17α-valeroxy-Δ$^{3,5}$-pregnadien-21-ol-20-one
3-propargyloxy-17α-valeroxy-21-acetoxy-Δ$^{3,5}$-pregnadien-20-one
3-propargyloxy-Δ$^{3,5}$-pregnadiene-17α,21-diol-11,20-dione
3-propargyloxy-Δ$^{3,5}$-pregnadiene-11β,17α,21-triol-20-one
3-propargyloxy-21-acetoxy-Δ$^{3,5}$-pregnadiene-11β,17α-diol-20-one
3-propargyloxy-17α-valeroxy-Δ$^{3,5}$-pregnadiene-11β,21-diol-20-one
3-propargyloxy-17α-valeroxy-21-acetoxy-Δ$^{3,5}$-pregnadien-11β-ol-20-one 3-propargyloxy-21-(β-carboxy)propionoxy-Δ$^{3,5}$-pregnadiene-11β,17α-diol-20-one
3-propargyloxy-17α-(β-carboxy)-propionoxy-Δ$^{3,5}$-pregnadiene-11β,21-diol-20-one
3-propargyloxy-9α-fluoro-21-acetoxy-Δ$^{3,5}$-pregnadiene-11β,17α-diol-20-one
3-propargyloxy-9α-fluoro-17α-valeroxy-Δ$^{3,5}$-pregnadiene-11β,21-diol-20-one
3-propargyloxy-9α-fluoro-16β-methyl-Δ$^{3,5}$-pregnadiene-11β,17α,21-triol-20-one
3-propargyloxy-9α-fluoro-16β-methyl-21-acetoxy-Δ$^{3,5}$-pregnadiene-11β,21-diol-20-one
3-propargyloxy-9α-fluoro-16β-methyl-17α-valeroxy-Δ$^{3,5}$-pregnadiene-11β,21-diol-20-one
3-propargyloxy-9α-fluoro-16β-methyl-17α-valeroxy-21-acetoxy-Δ$^{3,5}$-pregnadien-11β-ol-20-one
3-propargyloxy-16β-methyl-Δ$^{3,5}$-pregnadiene-11β,17α,21-triol-20-one
3-propargyloxy-16β-methyl-21-acetoxy-Δ$^{3,5}$-pregnadiene-11β,17α-diol-3,20-dione
3-propargyloxy-9α-fluoro-16α-methyl-Δ$^{3,5}$-pregnadiene-11β,17α,21-triol-20-one
3-propargyloxy-9α-fluoro-16α-methyl-21-acetoxy-Δ$^{3,5}$-pregnadiene-11β,17α-diol-20-one
3-propargyloxy-9α-fluoro-16α-methyl-17α-valeroxy-Δ$^{3,5}$-pregnadiene-11β,21-diol-20-one
3-propargyloxy-9α-fluoro-16α-methyl-17α-valeroxy-21-acetoxy-Δ$^{3,5}$-pregnadien-11β-ol-20-one
3-propargyloxy-9α-fluoro-16α-methyl-17α-acetoxy-Δ$^{3,5}$-pregnadiene-11β,21-diol-20-one
3-propargyloxy-16α-methyl-Δ$^{3,5}$-pregnadiene-11β,17α,21-triol-20-one
3-propargyloxy-16α-methyl-21-acetoxy-Δ$^{3,5}$-pregnadiene-11β,17α-diol-20-one
3-propargyloxy-9α-fluoro-Δ$^{3,5}$-pregnadiene-11β,17α,21-triol-20-one
3-propargyloxy-16β-methyl-21-acetoxy-Δ$^{3,5}$-pregnadien-17α-ol-20-one
3-propargyloxy-16-methylene-Δ$^{3,5}$-pregnadiene-11β,17α,21-triol-20-one
3-propargyloxy-9α-fluoro-16-methylene-21-acetoxy-Δ$^{3,5}$-pregnadiene11β,17α-diol-20-one
3-propargyloxy-2α-methyl-21-acetoxy-Δ$^{3,5}$-pregnadien-17α-ol-11,20-dione 2 g. of the above prepared 3-propargyloxy-21-acetoxy-Δ$^{3,5}$-pregnadien-17α-ol-11,20-dione dissolved in 30 cc. of dimethylformamide is heated at reflux for 3 hours in the presence of 150 mg. of 10% Pd/C to give 21-acetoxy-benzo[d,e]pregnan-17α-ol-3,11,20-trione, M.P. 269–271° C.; [α]$_D^{22}$=+131° (dioxane, c.=0.5%).

Similarly, the following benzo[d,e]pregnanes are prepared:

benzo[d,e]pregnane-17α,21-diol-3,20-dione
17α-valeroxy-benzo[d,e]pregnan-21-ol-3,20-dione
17α-valeroxy-21-acetoxy-benzo[d,e]pregnane-3,20-dione
benzo[d,e]pregnane-17α,21-diol-3,11,20-trione
benzo[d,e]pregnane-11β,17α,21-triol-3,20-dione
21-acetoxy-benzo[d,e]pregnane-11β,17α-diol-3,20-dione
17α-valeroxy-benzo[d,e]pregnane-11β,21-diol-3,20-dione
17α-valeroxy-21-acetoxy-benzo[d,e]pregnan-11β-ol-3,20-dione
21-(β-carboxy)-propionoxy-benzo[d,e]pregnane-11β,17α-diol-3,20-dione
17α-(β-carboxy)-propionoxy-benzo[d,e]pregnane-11β,21-diol-3,20-dione
9α-fluoro-21-acetoxy-benzo[d,e]pregnane-11β,17α-diol-3,20-dione
9α-fluoro-17α-valeroxy-benzo[d,e]pregnane-11β,21-diol-3,20-dione
9α-fluoro-16β-methyl-benzo[d,e]pregnane-11β,17α,21-triol-3,20-dione
9α-fluoro-16β-methyl-21-acetoxy-benzo[d,e]pregnane-11β,17α-diol-3,20-dione
9α-fluoro-16β-methyl-17α-valeroxy-benzo[d,e]pregnane-11β,21-diol-3,20-dione
9α-fluoro-16β-methyl-17α-valeroxy-21-acetoxy-benzo[d,e]pregnan-11β-ol-3,20-dione
16β-methyl-benzo[d,e]pregnane-11β,17α,21-triol-3,20-dione
16β-methyl-21-acetoxy-benzo[d,e]pregnane-11β,17α-diol-3,20-dione
9α-fluoro-16α-methyl-benzo[d,e]pregnane-11β,17α,21-triol-3,20-dione
9α-fluoro-16α-methyl-21-acetoxy-benzo[d,e]pregnane-11β,17α-diol-3,20-dione
9α-fluoro-16α-methyl-17α-valeroxy-benzo[d,e]pregnane-11β,21-diol-3,20-dione
9α-fluoro-16α-methyl-17α-valeroxy-21-acetoxy-benzo[d,e]pregnan-11β-ol-3,20-dione
9α-fluoro-16α-methyl-17α-acetoxy-benzo[d,e]pregnane-11β,21-diol-3,20-dione
16α-methyl-benzo[d,e]pregnane-11β,17α,21-triol-3,20-dione
16α-methyl-21-acetoxy-benzo[d,e]pregnane-11β,17α-diol-3,20-dione
9α-fluoro-benzo[d,e]pregnane-11β,17α,21-triol-3,20-dione
16β-methyl-21-acetoxy-benzo[d,e]pregnan-17α-ol-3,20-dione
16-methylene-benzo[d,e]pregnane-11β,17α,21-triol-3,20-dione
16-methylene-21-acetoxy-benzo[d,e]pregnane-11β,17α-diol-3,20-dione
9α-fluoro-16-methylene-21-acetoxy-benzo[d,e]pregnane-11β,17α-diol-3,20-dione
2α-methyl-21-acetoxy-benzo[d,e]pregnan-17α-ol-3,11,20-trione

EXAMPLE 11

A solution of 2 g. of 3-propargyloxy-17β-acetoxy-Δ$^{3,5}$-androstadiene in 50 cc. of o-dichlorobenzene is heated at a temperature of about 135° C. for 4 hours in the presence of 200 mg. of 5% Pd/C and the 17β-acetoxy-benzo[d,e]androstan-3-one is obtained in 30% yield. The reaction medium, o-dichlorobenzene can be replaced by p. dichlorobenzene, chlorobenzene, benzonitrile or n-amyl alcohol.

EXAMPLE 12

A solution of 1 g. of 3-propargyloxy-17β-Δ$^{3,5}$-androstadiene in 50 cc. of pyridine is heated at reflux for 5 hours. The solvent is evaporated and the residue crystallized from methanol giving 17β-acetoxy-benz[d,e]androstan-3-one, 27% yield.

EXAMPLE 13

2 g. of 3-propargyloxy-17β-acetoxy-Δ$^{3,5}$-androstadiene is dissolved in 60 cc. of pyridine and 2 cc. of ethyl cinnamate and the mixture is heated at reflux for 4 hours in the presence of 100 mg. of palladium charcoal. The 17β-acetoxy-benz[d,e]androstan - 3 - one is recovered in 32% yield.

EXAMPLE 14

A solution of 2 g. of 3-propargyloxy-Δ$^{3,5}$-pregnadien-20-one in 30 cc. of pyridine is heated at reflux for 4 hours in the presence of 100 mg. of platinum charcoal. After filtration of the catalyst the solvent is evaporated and the residue, crystallized from methanol, gives 750 mg. of benzo[d,e]pregnane - 3,20 - dione, M.P. 214–215° C.; [α]$_D^{22}$=+53° (dioxane, c.=0.5%). Pyridine can be replaced by collidine, pirazine, pirimidine, quinoline or dimethylaniline.

EXAMPLE 15

A solution of 1 g. of 3-propargyloxy-17β-acetoxy-Δ$^{3,5}$-androstadiene in 20 cc. of dimethylsulfoxide is heated at 115° C. for 3 hours in the presence of 100 mg. of 10% palladium on charcoal. After cooling, the mixture is diluted with water and extracted with methylene chloride. The combined extracts are washed thoroughly with water and concentrated to dryness to give an oily residue, which, crystallized from methanol provides 300 mg. of 17β-acetoxy-benz[d,e]androstan-3-one.

We claim:

1. A process for the preparation of a 3-keto benzo[d,e] steroid having in rings A and B of the steroid nucleus the structure:

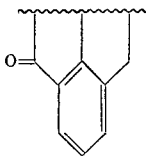

which comprises heating a 3-propargyl enolether of the corresponding Δ⁴-3-ketosteroid of the formula:

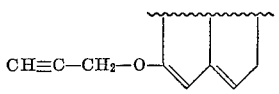

in an anhydrous organic medium at a temperature of from about 110 to about 180° C. and in the presence of a cyclodehydrogenation catalyst selected from the group consisting of palladium and platinum.

2. A process for the preparation of a 3-keto benzo[d,e] steroid of the androstane and pregnane series having the formula:

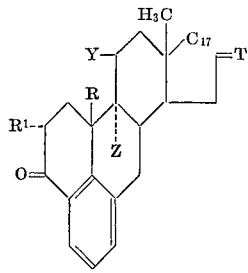

wherein R is selected from the group consisting of hydrogen and methyl; R¹ is selected from the group consisting of hydrogen, fluorine and methyl; Y is selected from the group consisting of hydrogen, a β-hydroxy group and a keto group; Z is selected from the group consisting of hydrogen, fluorine and chlorine; T is selected from the group consisting of H₂, (αH, βCH₃), (αCH₃, βH), (αH, βF), (αF, βH), (αH, βCl), (αCl, βH) and =CH₂; the C₁₇ carbon atom has the structure selected from the group consisting of the following groupings:

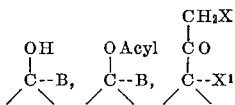

where X and X¹ are each selected from the group consisting of hydrogen, hydroxyl and a lower acyloxy group (OAcyl) up to 9 carbon atoms, inclusive; and B is selected from the group consisting of hydrogen and a lower hydrocarbon radical of from 1 to 3 carbon atoms, inclusive, with T being H₂ when B is other than hydrogen, which comprises heating a 3-propargyl enolether of the corresponding Δ⁴-3-ketosteroid of the formula:

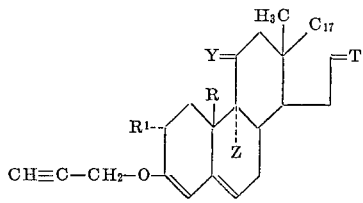

where R, R¹, Y, Z, T and the C₁₇ carbon atom are as defined above, in an anhydrous organic medium at a temperature of from about 110° to about 180° C. and in the presence of a cyclodehydrogenation catalyst selected from the group consisting of palladium and platinum.

3. A process for the preparation of 17β-acetoxy-benz [d,e]androstan-3-one of the formula:

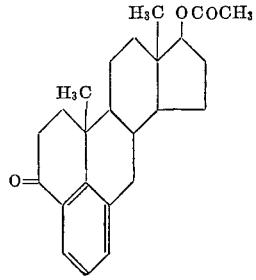

which comprises heating 3-propargyl enolether of testosterone acetate of the formula:

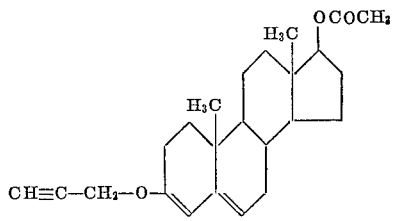

in an anhydrous organic medium at a temperature of from about 110° to about 180° C. in the presence of a cyclodehydrogenation catalyst selected from the group consisting of palladium and platinum.

4. The process of claim 1 in which the organic medium is selected from the group consisting of pyridine, dimethylformamide and dimethylsulfoxide.

5. The process of claim 2 in which the organic medium is selected from the group consisting of pyridine, dimethylformamide and dimethylsulfoxide.

6. The process of claim 3 in which the organic medium is selected from the group consisting of pyridine, dimethylformamide and dimethylsulfoxide.

7. A 3-keto benzo[d,e]steroid having the formula:

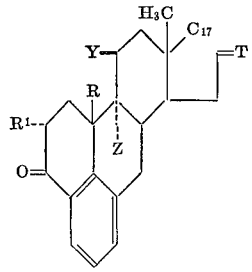

wherein R is selected from the group consisting of hydrogen and methyl; R¹ is selected from the group consisting of hydrogen, fluorine and methyl; Y is selected from the group consisting of hydrogen, a β-hydroxy group and a keto group; Z is selected from the group consisting of hydrogen, fluorine and chlorine; T is selected from the group consisting of H₂, (αH, βCH₃), (αCH₃, βH), (αH, βF), (αF, βH), (αH, βCl), (αCl, βH) and =CH₂; the C₁₇ carbon atom has the structure selected from the group consisting of the following groupings:

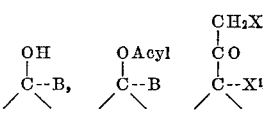

where X and X¹ are each selected from the group consisting of hydrogen, hydroxyl and a lower acyloxy group (OAcyl) up to 9 carbon atoms, inclusive; and B is selected from the group consisting of hydrogen and a lower hydrocarbon radical of from 1 to 3 carbon atoms, inclusive, with T being $H_2$ when B is other than hydrogen.

8. 17α-methyl-benz[d,e]androstan-17β-ol-3-one.

9. A steroid compound selected from the group consisting of benz[d,e]androstan-17β-ol-3-one of the formula:

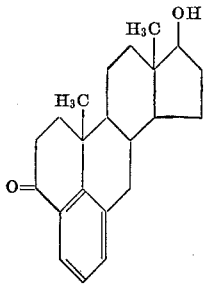

and its 17β-lower acyl esters containing up to 9 carbon atoms.

10. Benz[d,e]androstan-17β-ol-3-one.
11. 17β-acetoxy-benz[d,e]androstan-3-one.
12. 19-nor-benz[d,e]androstan-17β-ol-3-one.
13. 17β-acetoxy-19-nor-benz[d,e]androstan-3-one.
14. 17α-ethynyl - 19 - nor-benz[d,e]androstan-17β-ol-3-one.
15. 17α-ethynyl-17β-acetoxy - 19 - nor-benz[d,e]androstan-3-one.
16. Benzo[d,e]pregnane-3,20-dione.
17. Benzo[d,e]pregnane - [17β] 17α-ol-3,20-dione 17-acetate.
18. A steroid compound selected from the group consisting of benzo[d,e]pregnane-11β,17α,21-triol-3,20-dione of the formula:

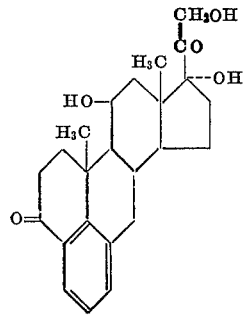

and the 9α-halo, 9α-halo-16α-methyl and 9α-halo-16β-methyl derivatives of said benzo[d,e]pregnane-11β, 17α, 21-triol-3,20-dione and 21-acetates thereof.

19. 9α-fluoro-benzo[d,e]pregnane - 11β,17α,21 - triol-3,20-dione.

20. A 3-propargyl enolether of a Δ⁴-3-ketosteroid having the formula:

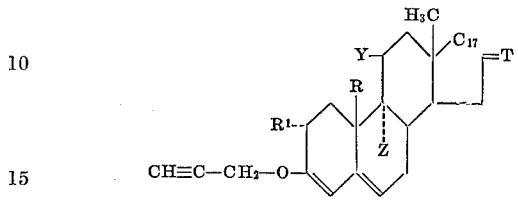

wherein R is selected from the group consisting of hydrogen and methyl; $R^1$ is selected from the group consisting of hydrogen, fluorine and methyl; Y is selected from the group consisting of hydrogen, a β-hydroxy group and a keto group; Z is selected from the group consisting of hydrogen, fluorine and chlorine; T is selected from the group consisting of $H_2$, (αH, βCH₃), (αCH₃, βH), (αH, βF), (αF, βH), (αH, βCl), (αCl, βH) and =CH₂; and the $C_{17}$ carbon atom has a structure selected from the group consisting of the following groupings:

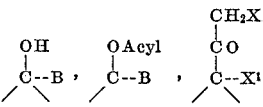

where X and $X^1$ are each selected from the group consisting of hydrogen, hydroxyl and a lower acyloxy group up to 9 carbon atoms, inclusive; B is selected from the group consisting of hydrogen and a lower hydrocarbon radical of from 1 to 3 carbon atoms, inclusive, with T being $H_2$ when B is other than hydrogen.

21. 3-propargyl enolether of testosterone acetate.

References Cited

UNITED STATES PATENTS 3,300,485  1/1967  Komeno.

HENRY A. FRENCH, Primary Examiner.

U.S. Cl. X.R.

167—74; 260—397.4, 397.45, 397.47, 397.5

UNITED STATES PATENT OFFICE
CERTIFICATE OF CORRECTION

Patent No. 3,419,582

December 31, 1968

Alberto Ercoli et al.

It is certified that error appears in the above identified patent and that said Letters Patent are hereby corrected as shown below:

Column 1, line 56, "methsulfoxide" should read -- methylsulfoxide --.
Column 2, lines 41 to 53; column 11, lines 28 to 40 and column 12, lines 44 55, the formulas, each occurrence, should appear as shown below:

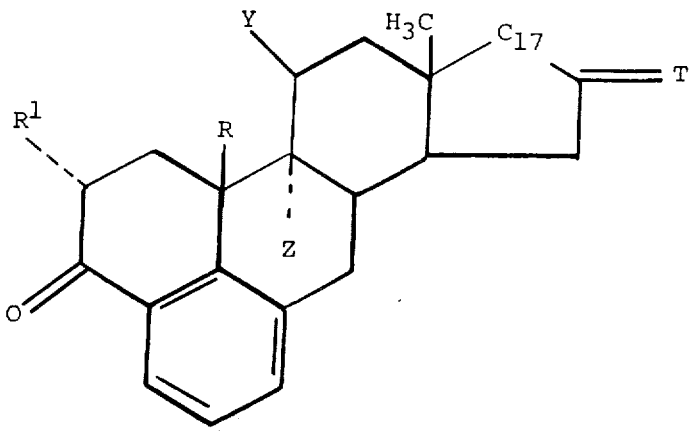

Column 5, lines 3 to 12; column 11, lines 64 to 72 and column 14, lines 8 to 16 the formulas, each occurrence, should appear as shown below:

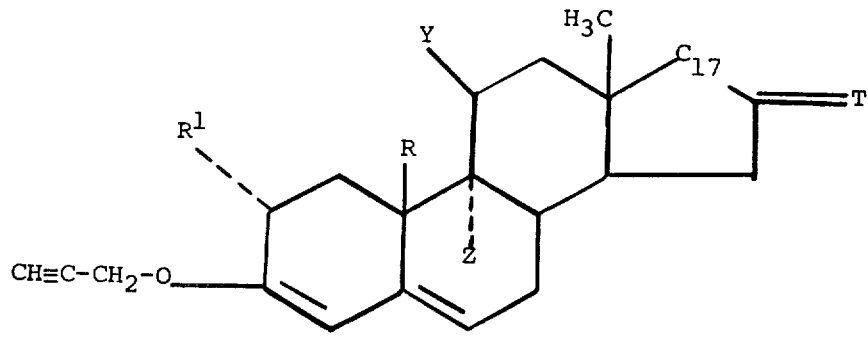

Column 10, line 45, after "-17β-" insert -- acetoxy --.

Signed and sealed this 31st day of March 1970.

(SEAL)
Attest:

EDWARD M. FLETCHER, JR.
Attesting Officer

WILLIAM E. SCHUYLER, JR.
Commissioner of Patents